200-144 SR
6/15/87 OR RE 32,440

United States Patent [19]
Innami et al.

[11] E Patent Number: Re. 32,440
[45] Reissued Date of Patent: Jun. 16, 1987

[54] VACUUM CIRCUIT INTERRUPTER

[75] Inventors: Yoshiyuki Innami, Tokyo; Takahumi Hashimoto, Higashiminemachi, both of Japan

[73] Assignee: Kabushiki Kaisha Meidensha, Tokyo, Japan

[21] Appl. No.: 437,144

[22] Filed: Oct. 27, 1982

Related U.S. Patent Documents

Reissue of:
[64] Patent No.: 4,306,128
Issued: Dec. 15, 1981
Appl. No.: 132,421
Filed: Mar. 21, 1980

[30] Foreign Application Priority Data

| | | | |
|---|---|---|---|
| Mar. 23, 1979 | [JP] | Japan | 54-34608 |
| Apr. 14, 1979 | [JP] | Japan | 54-46261 |
| Apr. 18, 1979 | [JP] | Japan | 54-52231[U] |
| Apr. 24, 1979 | [JP] | Japan | 54-54925[U] |

[51] Int. Cl.[4] ..... H01H 33/66
[52] U.S. Cl. ..... 200/144 B
[58] Field of Search ..... 200/144 B, 147 R; 335/3, 153, 193

[56] References Cited

U.S. PATENT DOCUMENTS

| | | | |
|---|---|---|---|
| 3,071,667 | 1/1963 | Lee | 200/144 B |
| 3,372,258 | 3/1968 | Porter | 200/144 B |
| 3,920,942 | 11/1975 | Yanagisawa | 200/144 B |

FOREIGN PATENT DOCUMENTS

| | | | |
|---|---|---|---|
| 392663 | 10/1965 | Switzerland | 200/144 B |
| 1444845 | 8/1976 | United Kingdom . | |

OTHER PUBLICATIONS

John Kraus, Electromagnetics, McGraw Hill, 1953, p. 166.

*Primary Examiner*—A. D. Pellinen
*Assistant Examiner*—Morris Ginsburg
*Attorney, Agent, or Firm*—Lowe, King, Price & Becker

[57] ABSTRACT

[The invention disclosed a vacuum type electric circuit interrupter comprising a highly evacuated envelope which includes at least one metallic tube made of the magnetic material or the ferromagnetic material, a pair of relatively movable contacts disposed within said envelope in a location and means for eliminating the magnetodistortion of said metallic tube. This means comprises a magnetic flux generating member for supplying the magnetic flux to said metallic tube. The noise generated from the vacuum circuit interrupter is, accordingly, eliminated by means of a magnetic field applying member for applying previously the magnetic field to said metallic tube or by increasing the magnetic reluctance of the metallic tube.] *A vacuum type electric circuit interrupter comprises a highly evacuated envelope including at least one metallic tube made of magnetic or ferromagnetic material and a pair of relatively movable contacts disposed within the envelope. A magnetic flux generator on the metallic tube substantially eliminates magnetostriction generated in the metallic tube by an alternating magnetic field caused by an alternating current flowing in the contacts through conductive rods. Acoustic noise is, accordingly, substantially reduced. To these ends, a magnetic field applied to the metallic tube by a magnetic flux generator has a flux density such that a portion of the metallic tube is saturated.*

12 Claims, 20 Drawing Figures

FIG. 17
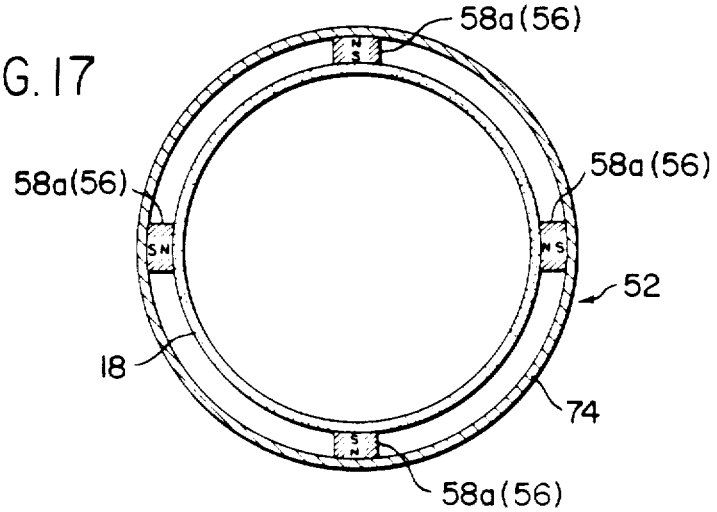
FIG. 18
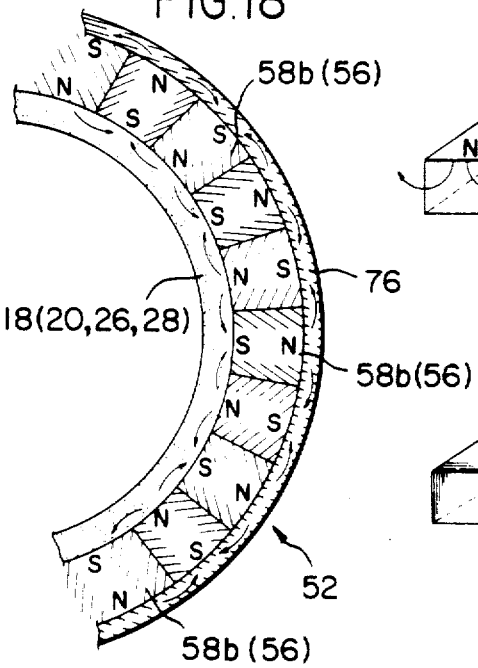
FIG. 19
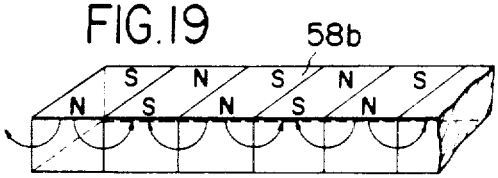
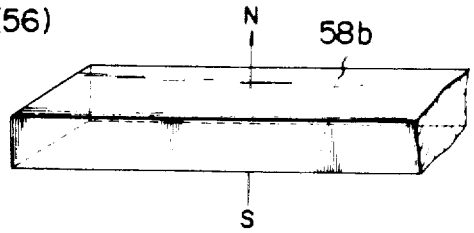
FIG. 20

VACUUM CIRCUIT INTERRUPTER

Matter enclosed in heavy brackets [ ] appears in the original patent but forms no part of this reissue specification; matter printed in italics indicates the additions made by reissue.

The present invention relates to a circuit interrupter of the vacuum type, and more particularly, to a noise free vacuum circuit interrupter which eliminates the noise generated by the current therethrough.

Power vacuum [switches] *interrupters* have, in general, found extensive application in [switching] *interrupting* power lines in power substations and [also] in large scale power equipment. A conventional power vacuum [switch] *interrupter* comprises, as will later be described with reference to the drawing, fixed and movable electrodes which are disposed in substantial alignment with each other, and the latter is moved toward or away from the former for respectively [making] closing and opening the [switch contacts] *vacuum circuit interrupter*. In such a conventional construction, when the [switch] *interrupter* is closed, an alternating current flows through the power [switch] *interrupter* and thereby noise is generated by the alternating magnetic field generated by the alternating current.

Recently with *the* growth [in population of concurbation] *and concentration of population* and the increase of building density the need for electric power has rapidly increased. However it is always very difficult to eliminate the noise of a vacuum power interrupter. Accordingly, efforts have been directed to reduce the noise generated.

Referring first to FIG. 1, there is shown a conventional vacuum type circuit interrupter[. In FIG. 1, reference numeral 10 shows] *including* a highly evacuated envelope[. Reference numeral 12 denotes a tubular] *10 containing cylindrical* insulating h ousing *12*, and [reference numerals 14 and 16 are] a pair of metallic end [caps] *plates 14 and 16*. Reference numerals 18, *20*, *26* and [20 illustrates] *28 illustrate* metallic tubes, and 22, 24 are insulating tubes. Moreover, reference numerals 26 and 28 are metallic tubes for connecting the insulating tubes 22 and 24. [Reference 20 shows a] *A* stationary contact fastened to a stationary supporting rod 34, and [reference numeral 32 is a] movable contact *32 is* secured to a movable rod 36.

In the conventional vacuum circuit interrupter shown in FIG. 1, each of shields 42, 44 and 46 and a disc 48 is, generally, made of a nonmagnetic material such as an austetinic stainless steel. On the other hand, each of the [central] metallic tubes *18*, *20*, 26 and 28 is made of a ferromagnetic material such as Fe-Ni-Co alloy or Fe-Co alloy because it is preferable to use a metal [of which the] *having a* coefficient of thermal expansion [is] equal approximately to that of the insulating tubes 22 and 24. The [magnetodistortion] *alternating magnetostriction* is generated by the alternating current magnetic field caused by the alternating current which flows between the stationary contact 30 and the movable contact 32, because the tubes *18*, *20*, 26 and 28 are made of a ferromagnetic material. Under these conditions, an important problem encountered is that the metallic tubes 18, 20, 26 and 28 generate mechanical noise which is caused by the vibration of the metallic tubes, particularly when the alternating current in the order of [200] *2000* to [300] *3000* amperes flows through the vacuum circuit interrupter.

In more detail, the metallic tubes 18, 20, 26 and 28 [forms] *form* a magnetic circuit when the alternating magnetic flux is induced by the alternating current flowing through the supporting rod 34 and the operating rod 36. The magnetic field intensity H [or the magnetizing force F] due to the current supplied [thereto] *to the metallic tubes* is represented by *a factor proportional to 1/r; in more detail, the magnetic density H is represented by*

$$[H=1/2\pi r(AT/m)]$$

$$H=1/2\pi r(A/m),$$

where I is the supplied current and r is the distance from the current path to the metallic tubes 18, 20, 26 and 28 which corresponds to a radius of the metallic tubes.

As [will be soon] *seen* from *the above* equation [(1)], the alternating magnetic field intensity in each metallic tube is about 6400 [AT/m] *A/m*, when the supplied current I is [300] *3000* A, and the radius r of the metallic tube [was] is 0.075 m. [Magnetodistortion] *Magnetostriction* appears in the ferromagnetic metallic portions such as the metallic tubes 18, 20, 26 and 28 due to the alternating magnet field H which is induced therein by the alternating current. From the induction of the [magnetodistortion] *magnetostriction*, the metallic tubes are vibrated by the expanding and contradiction thereof and, as a result, [the] noise is generated. In this case, the noise level [was] *is* 70 dB at [a] point P [shwn] *shown* in FIG. 1 when the current frequency was 50 Hz. The measurement was carried out by the A-characteristic of a [compromise] noise meter, and the background noise was 44 dB. Moreover, the [background] noise *level* was 69 to 72 dB under the same measuring condition as that of the above case, when the radius of the metallic tubes was 0.08 m. Accordingly, reduction of the noise generated from the vacuum circuit interrupter is extremely desirable, particularly when the interrupter is used in a crowded urban environment.

It is, accordingly, an object of the present invention to provide an improved vacuum circuit interrupter which over comes the above described drawbacks, namely, a vacuum circuit interrupter which eliminates the noise generated by current which flows therethrough.

More specifically, an object of the present invention is to provide a vacuum circuit interrupter which can avoid the generation of the vibrating noise due to the alternating magnetic field generated by current which flows through the circuit interrupter.

BRIEF DESCRIPTION OF THE DRAWINGS

Additional objects and advantages will become apparent upon consideration of the following description when taken in conjunction with the accompanying drawings. In the accompanying drawings like parts in each of the several figures are identified by the same reference [character] *characters*, and.

FIG. [12] *11* is a [fragmental] *fragmentary* view of the vacuum circuit interrupter of [other] *another* embodiment of the present invention.

FIG. [13] *12* is a [fragmental] *fragmentary* sectioned view of the vacuum circuit [breaker] *interrupter* in accordance with *a* further embodiment of the present invention.

FIG. [14] *13* is a cross-sectional view of the vacuum circuit interrupter in accordance with the present invention.

FIG. [15] *14* is a [cross-sectioned] *cross-sectional* view of a modification of the vacuum circuit interrupter of FIG. [14] *13*.

FIG. [16] *15* is a [cross-sectioned] *cross-sectional* view of a modification of the vacuum circuit interrupter of FIG. [15] *14*.

FIG. [17] *16* is a [fragmental sectioned] *fragmentary sectional* view of [other] *another* modification of the vacuum circuit interrupter of the present invention.

FIG. [18] *17* is a [cross-sectioned] *cross-sectional* view of the vacuum circuit interrupter of *the* further modification of FIG. [16] *15*.

FIG. [19] *18* is a [fragmental sectioned] *fragmentary sectional* view of the vacuum circuit interrupter in accordance with *a* further embodiment of the present invention.

FIG. [20] *19* is an [elevational] *elevation*, perspective view of a modification of a magnetic flux generating member and, FIG. [21] *20* is an elevational perspective view of *a* further modification of a magnetic flux generating member.

Figure 1:
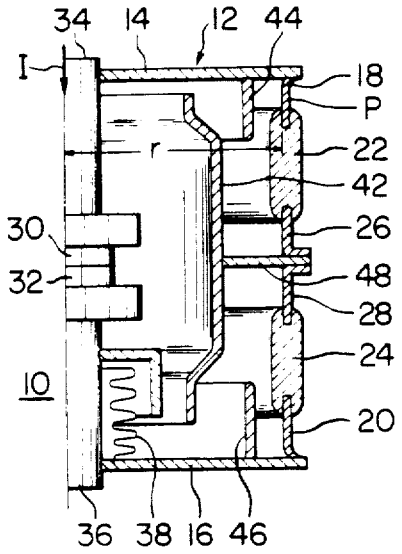
FIG. 1 (PRIOR ART)
FIG. 1 is an elevation sectional view of the conventional vacuum circuit interrupter.
Figure 2:
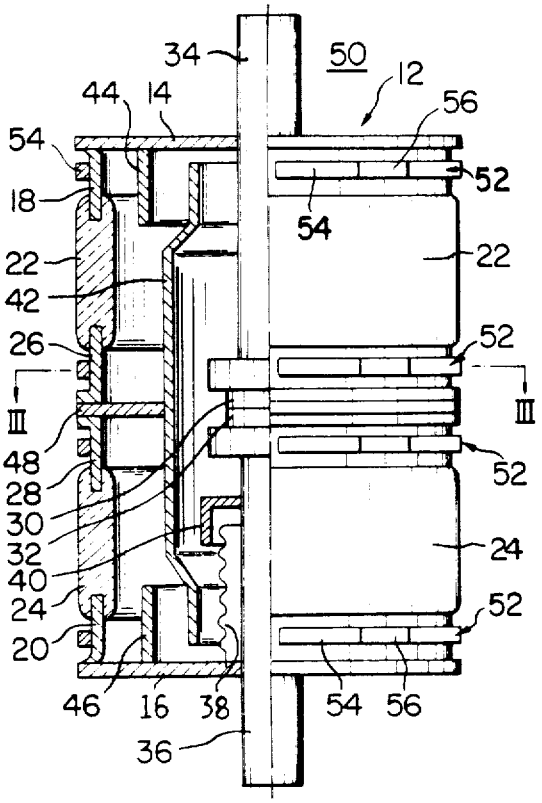
FIG. 2 is a [fragmentally] *fragmentary* sectional elevation view of the vacuum circuit interrupter.
Figure 3:
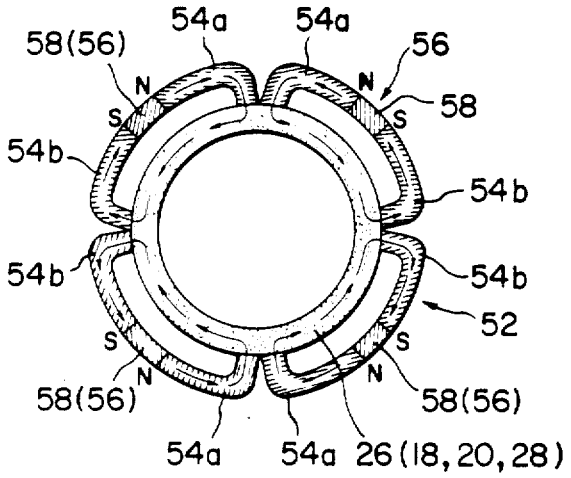
FIG. 3 is a cross-sectional view taken along line III—III of FIG. 2.

Referring to the drawings, particularly to FIGS. 2 and 3, there is shown a vacuum circuit interrupter embodying the present invention. This vacuum circuit interrupter comprises a highly evacuated envelope 50. This envelope 50 comprises a [tubular] *cylindrical* insulating housing 12 and a pair of metallic end [caps] *plates* 14 and 16 located at opposite ends of the insulating housing 12. The end [caps] *plates* 14 and 16 are [jointed] *joined* to the insulating housing 12 by vacuum tight seals in the form of metallic tubes 18 and 20.

The insulating housing 12 comprises two [short] tubular *insulating* sections 22 and 24, each of a suitable glass or ceramic. It should be noted that the number of the sections is not restricted to two; other embodiments of the present invention may have a different number. These tubular insulating sections are disposed collinearly and are [jointed] *joined* together by metallic [glass-to-metal seals] *tubes 26 and 28 through an annular metallic disc 48* between the insulating sections.

Disposed within the envelope 50 are two contacts *30 and 32* movable relative to each other, shown in their fully [contacted] *engaged* position. [The upper contact 30 is a stationary contact, and the lower contact 32 is a movable contact.] The stationary *upper* contact 30 is suitably brazed to the lower end of a conductive supporting rod 34, which is integrally [jointed] *joined* at its upper end to the metallic end plate 14. The movable *lower* contact 32 is suitably brazed to the upper end of a conductive operating rod 36, which is vertically movable to effect opening and closing of the interrupter.

For permitting vertical motion of the operating rod 36 without impairing the vacuum inside the envelope 50, a suitable bellows 38 is provided around the operating rod 36. A cup-shaped shield 40 surrounds the bellows 38 and protects it from being bombarded by arcing products.

The interrupter can be operated by driving the movable contact 32 upward and downward to close and open the power line. When the contacts *30 and 32* are engaged, current can flow between opposite ends of the interrupter via the path 36, 32, 30 and 34.

Circuit interruption is effected by driving the contact 32 downward from the closed contacts position by suitable operating means (not shown). This downward motion establishes an arc between the contacts. Assuming an alternating current circuit, this arc persists until about the time a natural *zero* current [zero] is reached, at which time [it] *the arc* vanishes and is thereafter prevented from reigniting by the high dielectric strength of the vacuum. A typical arc is formed during the circuit interrupting operation. For protecting the insulating housing [50] *12* from the metallic vapors, a series of [shield] *shields* 42, 44 and 46 are provided. The main shield 42 is supported on the tubular insulating housing by means of an annular metallic disc 48. This disc 48 is suitably [jointed] *joined* at its outer periphery to the central metallic tubes 26 and 28 and at its inner periphery to shield 42. The shields [18] *44* and [20] *46*, which are of metal, [cooperate with] *are joined on* the metallic end plates 14 and 16.

In the vacuum circuit interrupter as constructed above, each of the shields 42, 44 and 46 and the disc *48* are, generally, made of a non-magnetic material such as an austenitic stainless steel. On the other hand, each of the metallic tubes 18, 20, 26 and 28 is a ferromagnetic material such as an Fe-Ni-Co alloy or [Fe-Co] *Fe-Ni* alloy, because it is preferable to use a metal [of which the] *having a* coefficient of thermal expansion [is] equal to that of the insulating tubes 22 and 24.

An important feature of the invention is that, as is shown in FIG. 2, a [magnet] *magnetic* field *applying* means 52 is provided on each of the metallic tubes 18, 20, 26 and 28 in order to apply a magnetic field to *the* metallic [tube] *tubes*. The magnetic field applying means 52 comprises a magnetic flux generating member 56 for generating a magnetic flux to be applied to the metallic tubes, and a mounting means 54 for mounting the magnetic flux generating member 56 to the [envelope 50] *metallic tubes*.

As is best shown in FIG. 3, four sets of magnetic field applying means 52 are circumferentially arranged on the peripheral surfaces of metallic tubes 18, 20, 26 and 28. Each of the magnetic field applying means 52 comprises a magnetic flux generating member 56 consisting of (*1*) a permanent magnet 58 for generating the [matnetic] *magnetic* flux to be applied to the ferromagnetic portion of the housing 12, *and* (*2*) a mounting member 54 including a pair of yokes 54a and 54b which are of curved shape.

The yokes 54a and 54b are made of a high magnetic permeability material such as silicon steel, pure iron, or a permalloy. Each base portion of the yokes 54a and 54b is secured to the outer peripheral surface of the metallic tube 26 (*18, 20, 28*) by a suitable adhesive. The permanent magnet 58 is a conventional permanent magnet which is made of a hard magnetic material such as rare earth-cobalt, platinum-cobalt, a [ferlite] *ferrite* or [an alnico] *Alnico*. The permanent magnet [48] *58* is secured between end portions of the opposite yokes 54a and 54b by *a* suitable adhesive [agent].

In this embodiment, the permanent magnet 58, is a cuboid 14 mm×15 mm×15 mm, and has magnetic flux density of the order of 0.91–0.98 $Wb.m^{-2}$ which corresponds to 9100–9800 G, and [coercivity] *coercive force* $_{I}H_{C}$ of [$5.01\times10^{5}-5.81\times10^{5}Am-1$(6300-7300G). $5.01\times10^{5}-5.81\times10^{5}Am^{-1}$(*6300-7300 Oe*).Naturally, the [coercivity] *coercive force* $_{I}H_{C}$ is sufficiently large that the permanent magnet 58 is not demagnetized by the alternating magnet field of intensity $Hp=I/2\pi r$ exerted on the metallic tubes 18, 20, 26 and 28 by a normal current flow I(e.g., 3000 A)[, when the magnetic polarization is zero]. Moreover, the permanent magnet 58 is provided with a sufficient [coercivity] *coercive force* $_{I}H_{C}$ *so as* not to be demagnetized even by the magnetic field generated by an overcurrent an order of magnitude larger (commonly, for example 10–80 KA). As is shown in FIG. 3, four magnets 58 are circularly arranged with like poles adjacent. Under these conditions, magnetic paths are formed in closed loops each of which consists of a yoke 54a, a portion of the metallic tube, a yoke 54b and the permanent magnet 58. Lines of magnetic flux lie along the magnetic path, and thereby the magnetic field is constantly applied [from] *by* the permanent magnets 58 to the metallic tubes 18, 20, 26 and 28. The magnetic field intensity of the permanent magnets 58 is set such that the magnetic field in the metallic tubes is *in* the saturation state or approximately the saturation state and such that substantially no [magnetodistortion] *magnetostriction* is [coused] influenced by the alternating magnetic flux supplied to the metallic tubes when the normal alternating current flows through the interrupter.

Figure 4:
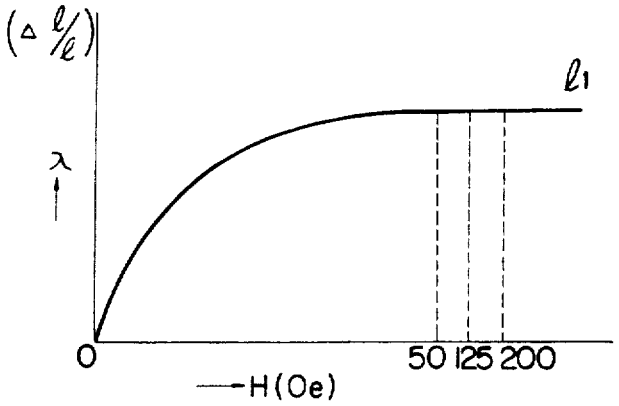
FIG. 4 is a graph showing a characteristic of an alloy of Fe-Ni-Co.

FIG. 4 [shows] *is a graph of* a characteristic of a [magnetic substance] *ferromagnetic material* which is made of Fe-Ni-Co alloy. It is generally known that the relative [distortion] *magnetostriction* $\lambda(=\Delta l/l)$ increases and finally saturates in accordance with the increment of the magnetic field intensity H [ϕrsted], as is shown by a curve $l_1$ of FIG. 4. Here l is the length of the [magnetic substance] *ferromagnetic material*. It is also known that magnetization of the [magnetic] *ferromagnetic* material is saturated when the magnetic field intensity H is more than 50 [ϕ(ϕrsted)] *Oe* (*Oersted*). The [magnetic] *ferromagnetic* material expands and [shrinks] *contracts* at right angles to the direction of the magnetic field H to [absord] *absorb* the variation in the length l. In addition, it is known that apparent magnetic reluctance R becomes large, that is, the magnetic [permiability $\mu s$] *permeability* $\mu_s$ becomes approximately equal to that of air [$\mu s=1$] ($\mu_s=1$) when the magnetic flux in a magnetic circuit reaches [the] *a magnetic* saturation state or approximately [the] *a magnetic* saturation [state].

According to the vacuum circuit interrupter shown in FIGS. 2 and 3, the metallic tubes 18, 20, 26 and 28 are made of the alloy of Fe-Co-Ni and the variation ratio of the [magnetodistortion] *magnetostriction* becomes zero when the amplitude of the alternating magnetic field is ±75 [ϕ] *Oe* by the application of the magnetic field due to the normal current flow *3000A* of the interrupter[. Accordingly, fluctuation of the magnetic field intensity can be kept within the range 50–200ϕ, as is best shown in FIG. 4, by], *when the radius of metallic tubes is 0.08 m. Accordingly, an alternating magnetic field larger than 50–200 Oe is applied to the metallic tubes 18, 20, 26 and 28, but the magnetostriction of metallic tubes is completely restricted by* application of a magnetic field intensity of 125 Oe from the permanent [magnets] *magnet* 58 [to the metallic tubes 18, 20, 26 and 28, and thereby the magnetodistortion of each metallic tube is completely restricted]. By [the restriction of magnetodistortion] *restricting the magnetostriction*, vibration of the metallic tubes is eliminated and thereby generation of the vibration noise is also [completely 173 prevented.

In the vacuum circuit interrupter shown in FIGS. 2 and 3, the vibration generated from the metallic tubes was 44–45 dB in a measurement of the A-characteristic of a [compromise] noise meter, under [the] *a* condition [that] where background noise was 44 dB, when the radius of the metallic tubes was [0.008] *0.080* m and the normal current flow was 3000 A, [of which] *at a* frequency [was] *of* 50 Hz. Accordingly, it is understood that the vibration noise [is perfectly] *was* eliminated.

Figure 5:
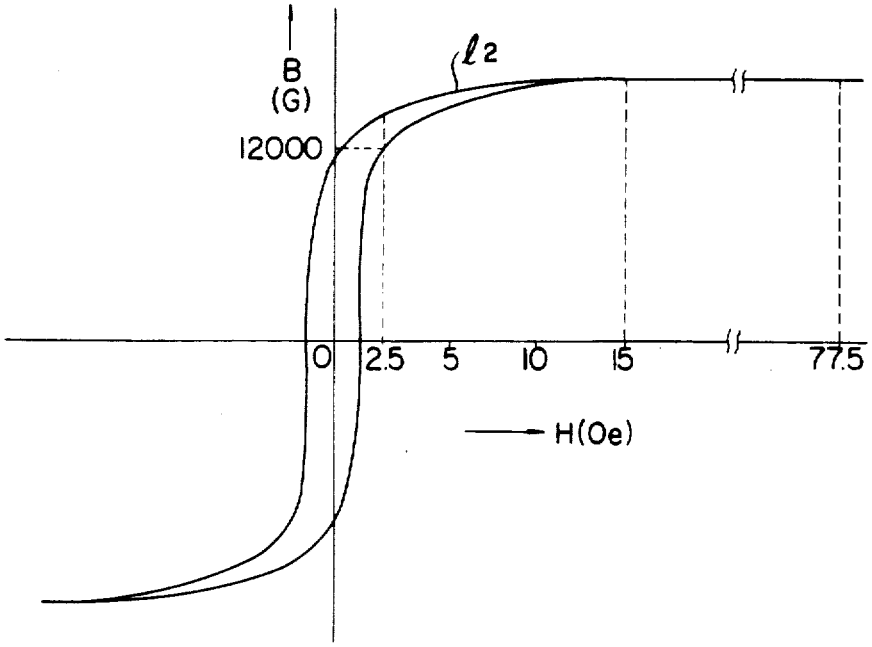
FIG. 5 is a graph showing a [histerises] *hysterises* loop of a ferromagnetic material.

As is shown by a [histerises loop] *BH hysteresis curve* $l_2$ of FIG. 5, [it is known that] the magnetic flux density B is approximately saturated when the magnetic field intensity H is about 2.5 Oe in the ferromagnetic material composed of the alloy of Fe-Ni-Co. The magnetic flux B is approximately constant, even when the magnetic field intensity H varies within the range from 77.5 (*2.5+75*) Oe to 2.5 [ϕ under the measuring conditions that the current which flows through the interrupter is 3000 A and that the distance r is 0.08 m] *Oe*. Consequently, the [magneto-distortion] *magnetostriction* is [extremely] eliminated *by the magnetic field intensity 77.5 Oe applied to the metallic tubes having a radius of* 0.08 m, with a current of 3000A, and thereby the vibration noise is [completely reduced] *removed* by the application of magnetic fields from the permanent magnets 58 to the metallic tubes 18, 20, 26 and 28.

Figure 6:
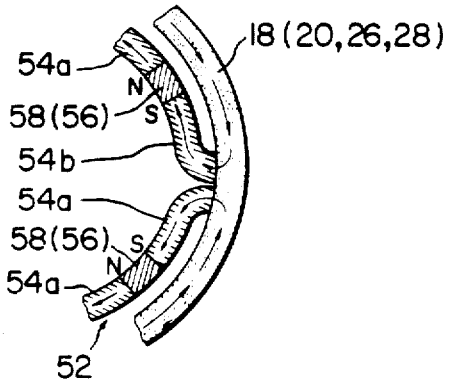
FIG. 6 is a [fragmental] *fragmentary* sectioned view of a modification of the interrupter of FIG. 3.

FIG. 6 [shows the] *is an illustration of a* modification of the magnetic field applying means employed in the present invention. In this embodiment, a plurality of magnetic field applying [members] *means* 52 are provided on the inner side of metallic tubes 18, 20, 26 and 28. In more detail, the magnetic field applying means 52 comprises a plurality of magnetic flux generating members 56 for supplying the magnetic flux to the metallic tubes 18, 20, 26, and 28 and a plurality of mounting members 54 for mounting the magnetic flux generating members 56. The magnetic flux generating member 56 comprises a permanent magnet 58. The mounting member comprises a pair of curved yokes 54a and 54b. The base portion of each of the yokes 54a and 54b is secured to the inner surface of the metallic tubes 18, 20, 26 and 28. The permanent magnet 58 of the magnetic flux generating member 56 is supported and secured between end portions of the yokes 54a and 54b by *a* suitable [adhesive] *connection*, as in the above described embodiment. In addition, the permanent magnets are also arranged coaxially with respect to the metallic tubes so that like poles are adjacent.

Figure 7:
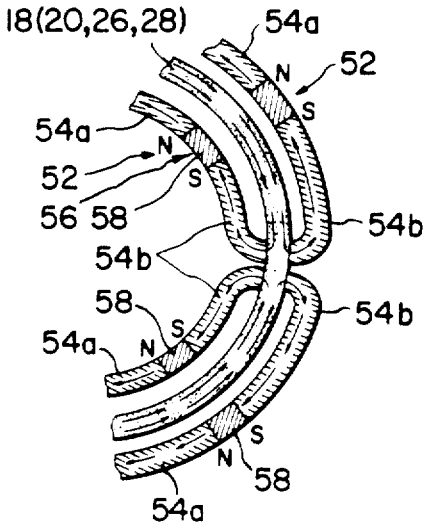
FIG. 7 is a [fragmental] *fragmentary* sectioned view of a further modification of the interrupter of FIG. 3.

FIG. 7 [shows an] *is an illustration of* another more effective embodiment of the invention. In the embodiment of FIG. 7, a plurality of magnetic field applying means 52 are provided on both the outer and inner peripheral [surface] *surfaces* of [on] metallic tubes 18, 20, 26 and 28. [Pair] *A pair* of curved yokes 54a and 54b are symmetrically secured to the outer peripheral surface and the inner peripheral surface of each metallic tube. Accordingly, a plurality of magnetic [flux generating] *field applying* means [56] *52* are circumferentially arranged on both [of] *the* outer and inner peripheral surfaces of [the] *each* metallic tube. The permanent magnets are also arranged coaxially with respect to [the] *each* metallic tube so that like poles are adjacent.

Figure 8:
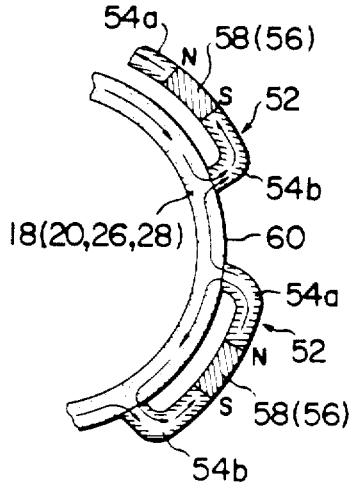
FIG. 8 is a [fragmental] *fragmentary* sectioned view showing other embodiment of the present invention.

FIG. 8 [shows] *is* a modification of the magnetic field applying means of FIG. 3. In the vacuum circuit interrupter of FIG. 8, magnetic field applying [members] *means* 52 are [provided] *spaced apart at predetermined intervals* on an outer surface of [the] *each* metallic tube [spaced apart at predetermined intervals]. In more detail, a pair of yokes 54a and 54b of the mounting member are fastened to the outer surface of the metallic *tubes* 18, 20, 26 and 28. The permanent magnets 58 of the magnetic flux generating [means] *member* 56 are provided between end portions of yokes 54a and 54b so that opposite poles are adjacent permanent magnet 58.

In accordance with the vacuum circuit interrupter of FIG. 8, the metallic tubes 18, 20, 26 and 28 are magnetized by the magnetic flux [circutation] *circulating* through the magnetic path formed by yokes 54a and 54b, the permanent magnet 58 and a portion of the metallic tubes 18, 20, 26 and 28 and by magnetic leakage flux 60 between the adjacent magnetic field applying [members] *means* 52. A magnetic path is formed by the permanent magnet 58, the yokes 54a, a portion of metallic tube *18* and the yoke 54b. The magnetic flux passes through the magnetic path to magnetize the metallic tube, and the leakage flux 60 is added to the adjacent magnetic field applying [member] *means* 52 to increase the magnetization of the metallic tube.

Although the permanent magnet 58 is secured by the pair of yokes 54a and 54b in the above embodiments of FIGS. 3, 6, 7 and 8, the invention is not limited to this technique and a C-shaped permanent magnet or a [circular are] *circularly* shaped permanent magnet can be employed instead of the permanent magnet 58 and the yokes 54a and 54b.

Figure 9:
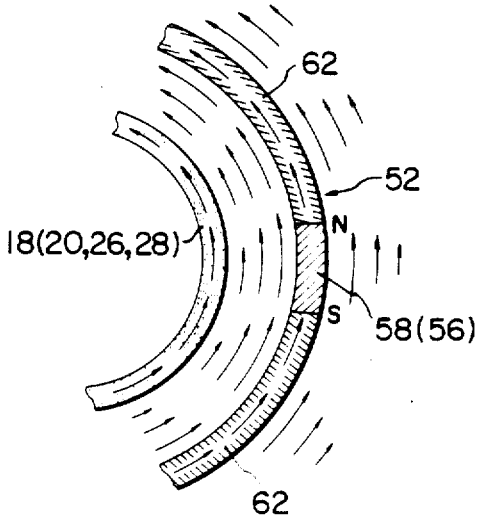
FIG. 9 is a fragmentary sectional view illustrating further embodiment of the present invention.

*In* FIG. 9, [illustrates] another embodiment of the present invention, a magnetic field applying means 52 comprises a [magnet] *magnetic* flux generating member 56 for supplying the magnetic flux to metallic tubes 18, 20, 26 and 28, and a mounting member for mounting the magnetic generating member 56. The magnetic flux generating member 56 comprises at least one permanent magnet 58. The mounting member comprises a ring-shaped yoke 62. The permanent magnet 58 is [encluded] *included* in the ring-shaped yoke 62. The yoke 62 is supported by [the] suitable supporting means (not shown). Lines of magnetic flux are generated [from] *by* the permanent magnet 58. A portion of the lines of magnetic flux passes through the yoke 62, and other portions of the lines of magnetic flux leak from a main magnetic path which includes the permanent magnet 58 and the yoke 62 to outer and inner portions thereof. The metallic [tube] *tubes* 18, 20, 26 and 28 are magnetized by leakage flux from the permanent magnet 58 such that the magnetic field of the metallic tube is approximately saturated, and thereby the [magnetodistortion] *magnetostriction* of the metallic tube reaches [the] *a magnetic* saturation state, even if *a* further magnetic field is added to the metallic tube by the current flowing through the circuit interrupter.

In [to] the vacuum circuit interrupter shown in FIG. 9, vibration noise was reduced to 43–45 dB under the same measuring conditions as that of the interrupter shown in FIG. [1] *2*. Although the magnetic field applying means 52 is provided [in] *on* the outer side of the metallic tube in the embodiment of FIG. 9, similar operations and effects can be obtained by [means of] providing a magnetic field applying means which comprises a ring-shaped yoke in which a suitable number of permanent magnets are interposed [to] *on* the inner side *of* the metallic tube or [to] *on* both [of] the inner side and the outer sides of the metallic tube.

Figure 10:
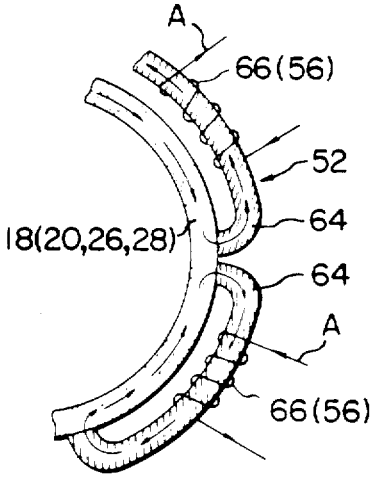
FIG. 10 [show] *is* a [fragmental] *fragmentary* view of *a* further embodiment of the vacuum circuit breaker in accordance with the present invention.

FIG. 10 [illustrates] *is an illustration of* a further embodiment of the vacuum circuit interrupter in accordance with the present invention. In this embodiment, a magnetic field applying means 52 comprises an [electro magnet] *electro-magnet* 66. The electro-magnet 66 includes an approximately C-shaped yoke 64 and a lead wire wound over the yoke 64. As is best seen in FIG. 10, a plurality of C-shaped yokes 64 are provided in alignment with the circumference[,] of the outer surface of metallic tubes 18, 20, 26 and 28 and the wire 66 is wound on each of the [yoke 66] *yokes 64*.

In the vacuum circuit interrupter of FIG. 10, magnetic flux is generated by supplying current to the wire 66 in the direction indicated by [arrow] *arrows* A. Each of the metallic tubes 18, 20, 26 and 28 is magnetized by the induced magnetic flux from the electromagnet, and thereby the [magnetodistortion] *magnetostriction* of the metallic tubes is prevented, in spite of the additional magnetic flux due to the current of the circuit interrupter.

In this exemplary embodiment, the plurality of [electric magnet] *electro-magnets* can be provided at any [places of] *place on* the metallic tube such as, for example, the inner surface, or both surfaces of the metallic tube. In this case, similar operations and advantages as in the case of FIG. 10 may be obtained.

Figure 11:
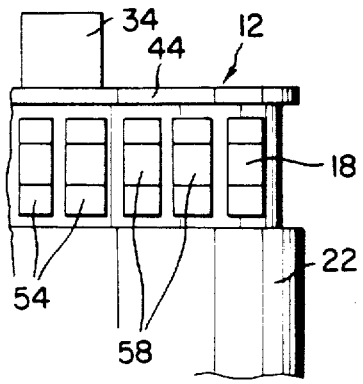
[FIG. 11 is a fragmental view of a modification of the vacuum circuit breaker of FIG. 10.]
Figure 12:
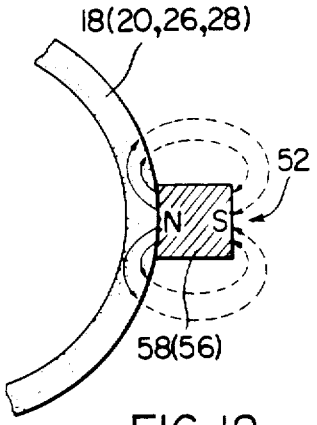

[FIG. 11 is an illustraties vacuum circuit interrupter which embodies the present invention. In the embodiment of FIG. 11, a magnetic field applying means 52 comprises a magnetic flux generating member 56 including a ring-shaped yoke 68 provided coaxially on the outer side of metallic tube, and a suleniod coil formed by winding a wire 66 on the yoke 68. When an current is supplied to the solenoid coil as is shown by an arrow B, the magnetic flux generating member 56 generates magnetic flux as is shown by arraws C. The metallic tubes are magnetized by leakage flux from the electro magnet which consists of the yoke 68 and the lead wire 66 wound on the yoke 68, so that the magnetic density of the metallic tubes are always in the saturation state. In the vacuum circuit breaker of FIG. 11, the background noise was about 50–54 dB, when the measurement was carried out in the same conditions as in the case of the first embodiment.]

FIG. [12] *11* shows [an other] *another* embodiment of the invention. In this embodiment, the difference, from the above described embodiments is that magnetic field is applied to *the* metallic tubes in a direction parallel to the main current path of the vacuum circuit [breaker] *interrupter*. In more detail, a plurality of permanent magnets 58 are [arranged] circularly spaced apart at a desired distance from each other on an outer peripheral surface of the metallic tube 18. The metallic tube 18 is magnetized in the longitudinal direction thereof. Each of the permanent magnets 58 is fastened to the outer surface of the metallic tube 18 by means of mounting members 54 in the form of a pair of yokes. Additionally, magnetic field applying means 52 of the above described various embodiments are also applicable to the vacuum circuit interrupter of FIG. [12] *11*.

FIG. [13] *12* shows [a possible] *another* embodiment of the present invention. In the vacuum circuit interrupter shown in FIG. [13] *12*, the apparent magnetic reluctance of the metallic [tubes] *tube is* increased by making the magnetic flux [reach] *be in a magnetic* saturation state. In more detail, at least one *of the* magnetic field applying means 52 is provided on the outer surfaces of the metallic tubes in order to avoid the harmful influences of an alternating magnetic field produced by current of the vacuum circuit interrupter. A magnetic flux generating member 56 comprises a permanent magnet 58 provided on an outer surface of the metallic tube 18. One end of the permanent magnet 58 is secured to the outer surface of the metallic tube 18 by means of adhesive.

In the circuit interrupter of FIG. [13] *12*, lines of magnetic flux from the permanent magnet 58 interlinks with a portion of the metallic tube 18. By the interlinkage of the magnetic flux with the metallic tube 18, the metallic tube 18 is magnetized so that the magnetic flux density is saturated to decrease the vibration noise due to the alternating magnetic field induced by the current flow of the vacuum circuit interrupter.

It is known that the apparent magnetic reluctance increases as mentioned above, when the magnetic flux density in a portion of the magnetic circuit reaches [the] *magnetic* saturation [state] or approximately the saturation state. Accordingly, the magnetic reluctance R of the portion of the magnetic circuit can be represented by *the* following equation $$[R = ls/\mu o \cdot \mu s (A\ Wb^{-1}) \quad (1)]$$

$$R = l/\mu_o \cdot \mu_s \cdot S (A\ Wb^{-1}) \quad (1)$$

where [r] *l* is the [radius] *length* of the *magnetized portion of the* metallic tube, [l] *S* is a cross sectional area of the *magnetized portion of the* metallic tube, [$\mu o = 4\pi \times 10^{-7}$(H/M)] $\mu_o = 4\pi \times 10^{-7}(H/M)$ is the permeability in the vacuum and [$\mu s$] $\mu_s$ is the relative permeability of the metallic tube. [Magnetic-motive] *Magneto-motive* force F is represented by [the following (equation),] *Equation (2)* when the current flowing through the vacuum interrupter is I.

$$[F = nI(AT),\ (n = 1) \quad (2)]$$

$$F = nI(A),\ (n = 1) \quad (2)$$

$$[\phi = F/R(Wb) \quad (3)]$$

$$\Phi = F/R(Wb) \quad (3)$$

where [$\phi$] $\Phi$ is the magnetic flux.

Since the relative permeability is approximately equal to 1 and the sectional area is S, the resulting magnetic flux is:

$$[B_1 = P/S(WbM^{-2}) \quad (4)]$$

$$B_1 = \Phi/S(Wb/m^2) \quad (4)$$

$$[(1Wb/M^2 = 10^4G).]$$

$$(1Wb/m^2 = 10^4G).$$

Further the resulting magnetic flux density is obtained by substituting the [equations] *Equations* (1), (2) and (3) *in* to [the equation] *Equation* (4):

$$[B1 = F/R.S = 4\pi(10^{-7})/l(Wb/m^2) \quad (5)]$$

$$B_1 = F/R.S. = 4\pi(10^{-7})/l(Wb/m^2) \quad (5)$$

When the [magnetic] *permanent magnet* field applying density is not provided on the metallic tube, the resulting magnetic flux density is:

$$[B2 = 4\pi(10^{-7\mu})I/2\pi r(Wb/m^2) \quad (6)]$$

$$B_2 = 4\pi(10^{-7})I \cdot \mu_s/2\pi r(Wb/m^2) \quad (6)$$

Consequently, the following relation is obtained:

$$[(B1/B2) = (1/\mu) \cdot (2\mu r/1) \quad (7)]$$

$$B_1/B_2 = 1/\mu_s \cdot 2\pi r/l \quad (7)$$

[The] *Because the* relative permeability of the alloy [of] Fe-Ni-Co [was] *is* 173, [and] the resulting [ratice] *ratio* of [B1] $B_1$ and [B2 was therefore.] $B_2$ *is:*

$$[(B1/B2) = (1/173) \cdot [\mu 150(10^{-3})/15(10^{-3})] = 0.18,]$$

$$(B1/B2) = (1/173) \cdot [\pi 150(10^{-3})/15(10^{-3})] = 0.18,$$

when the diameter [was] *is* 150 mm (r = 75 mm), the length l of the magnetized portion of the metallic tube [was] *is* 15 mm, and the current flow I [was] *is* 3000 Arms. Accordingly, it can be understood that the alternating magnetic field induced by the current I in the metallic tube is reduced to about 1/5 when the portion [(l = 15 mm)] (*l = 15 mm*) of the metallic tube is magnetized such that the magnetic flux density of the metallic tube is *in magnetic* saturation [state] or [about] *approximately in magnetic* saturation [state]. It is further to be understood that the vibration of the metallic tube due to the [magnetadistortion] *magnetostriction* is eliminated and thereby the noise due to the vibration of the metallic tube is reduced.

Moreover, the following experimental data were obtained by measuring by means of [the] *an* A-characteristic of a [compromise] noise meter under [the condition that] *conditions where* the background noise was 44 dB. Namely, the noise generated due to the vibration of the vacuum circuit interrupter was 51 dB at [the place spaced apart] *a point* 1.0 m from the vacuum circuit interrupter, when the radius of the vacuum circuit interrupter was 0.075 m and when the current flow I was 3000 A and its frequency was 50 Hz. Accordingly, the eliminated noise was about 19 dB with respect to the conventional vacuum circuit interrupter.

Figure 13:
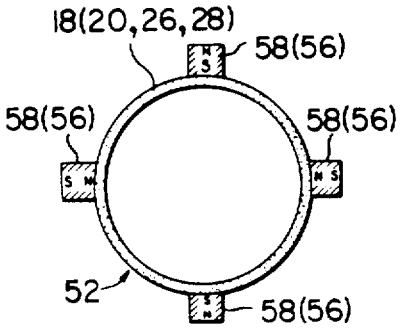
Figure 14:
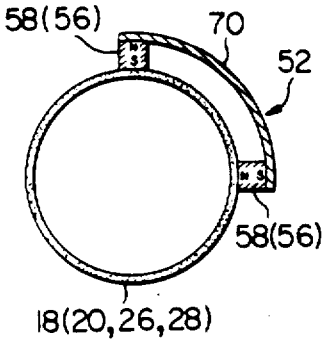
Figure 15:
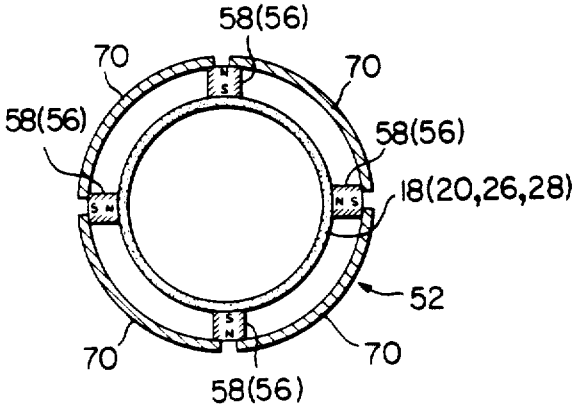
Figure 16:
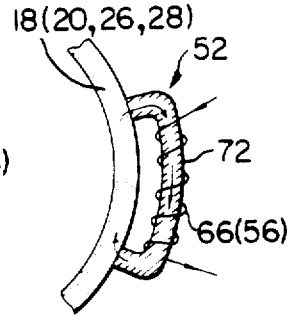

In the [embodiment] *embodiments* of [FIG. 13] *the present invention*, the permanent magnet 58 has a coersive force [so] *such* that the magnet 58 is not demagnetized by the magnetic field intensity [$H=80\times10^{-3}=4.25\times10^{5}$ (AT/m)=5340 (Oe)] $H=80\times10^{3}\times2.5/2\pi r=80\times10^{3}\times2.5/\pi\times150\times10^{-3}=4.25\times10^{5}(A/m)=5340(Oe)$, due to the [peals] *peak* value of 2.5 times [of] the maximum over current 80 [KArms] *KA(rms)*. The permanent magnet 58 [is] *may* also [substituted] *be replaced* by a permanent magnet having [the] *a* coersive force [so as not to] *such that it cannot* be demagnetized in accordance with the maximum value of the overcurrent.

FIG. [14] *13* is [illustrative] *an illustration* of one effective modification of the vacuum circuit interrupter. In the vacuum circuit interrupter of FIG. [14] *13*, a plurality of magnetic flux generating [member] *members* 56 are secured to a metallic tube 18 in order to increase the apparent magnetic reluctance of the metallic tube. In more detail, four permanent magnets [28] *58* are [provided] spaced apart equidistantly from each [to] *on* an outer surface of the metallic tube 18.

In a ccordance with the vacuum circuit [breaker] *interrupter* shown in FIG. [14] *13*, the noise due to the vibration was 46 dB under the same measuring [condition] *conditions* as in the case of FIG. [13] *12*.

FIG. [15] *14* is [illustrative] *an illustration* of [one possible] *another* modification of the vacuum circuit interrupter in accordance with the present invention. In the modification shown in FIG. [15] *14*, the vacuum circuit [breaher] *interrupter* further comprises a magnetic flux by-passing member in the form of a yoke 70 for leading lines of magnetic flux. In this embodiment, a plurality of permanent magnets [28 are] *58* secured to the outer surface of a metallic tube 18 *are* spaced apart at a predetermined distance from each *other*. In this case, [one of the] *first and second* permanent [magnet] *magnets* 58 [is] *are* secured to the metallic tube 18 so that [a position] *positive and negative* magnetic [polarity is] *pole faces thereof are respectively* positioned [to] *against* the metallic tube side, and [other is fastened] to the metallic tube 18 so that a negative polarity (S) is located to the *side of the* metallic tube [side]. The yoke 70 is bridged and secured between [the adjacent magnets 58] *the remaining pole faces of the first and second pole faces of magnets 58.*

According to the vacuum circuit interrupter of FIG. [15] *14*, the lines of magnetic flux produced [from] *by* each of the [magnet] *magnets* 58 are by-passed to the adjacent magnet by way of the yoke 70, and thereafter the magnetic flux circulates through the other magnet 58[,] *and* a portion of the metallic tube 18. Consequently, the amount of leakage magnetic flux is reduced by the aid of the yoke 70, and, as a result the apparent magnetic reluctance is effectively increased.

In accordance with the above described embodiment, the generated noise was 48 dB under the same measuring conditions as in the case of the vacuum circuit interrupter of FIG. [14] *13*.

FIG. [16 shows] *15 is an illustration of* an effective modification of the vacuum circuit interrupter of FIG. [15] *14*. The vacuum circuit interrupter [shown] comprises a plurality of closed magnetic circuits *each of* which includes a pair of permanent magnets 58 which are directly secured to the outer surface of a metallic tube 18 and a magnetic flux bridging segment in the form of a yoke 70. The pair of permanent magnets 58 are directly secured to the outer surface of the metallic tube 18 such that adjacent magnets have opposite polarity. Four closed magnetic loops are formed [around] *in* the circumferential direction and, accordingly the apparent magnetic reluctance is further increased. In this embodiment, the noise induced [from] *by* the interrupter was 44 dB in the same measuring [condition] *conditions* as that of the above embodiment. It is, accordingly, understood that the noise is [completely] *very much* reduced.

FIG. [17] *16* is [illustrative] *an illustration* of another embodiment of the present invention. The interrupter shown is [substantially] *very* similar to that of FIG. 10, and this magnetic field applying [member] *means* 52 can also [make] *be* the magnetic *saturated* reluctance of a portion of the metallic tube 18.

In the above description of the embodiments of FIGS. 3, 6–9, and [13–16] *12–15*, the detailed explanation has been in terms of permanent magnets 58 formed by sintering of ordinary ferromagnetic material, but the present invention is not limited to such conventional permanent magnets 58. For example, permanent magnets formed by resin binding of ordinary ferromagnetic material may be used. Alternatively, a rare earth-cobalt powder alloy such as samarium-cobalt may be bound with flexible plastic or rubber and formed into substantially rectangular shape to form a so-called plastic or rubber magnet. Again, the [power] *powder* alloy may be formed as a *magnetized* film on paper or the like[, magnetized,] and used as a flexible magnet. If permanent magnets of this resin bound or flexible type are used, then compared with conventional magnets, various advantages are obtained. For example, [in the manufacturing state,] *during manufacture* in the forming of connections, [particularly] *particular* problems with defects near the poles of the magnets are avoided. In [the ninth to twelfth] embodiments[,] where the poles of the magnets are joined to connecting rings it is possible to ensure a good connection.

FIG. [18 shows] *17 is an illustration of* a further embodiment of the vacuum circuit interrupter of the present invention. The vacuum circuit interrupter shown comprises a magnetic [flux generating] *field applying* means [56] *52*. The magnetic [flux generating] *field applying* means [56] *52* comprises four permanent magnets 58 [provided] *evenly spaced apart* on the outer surface of metallic tube 18, [evenly spaced apart] and a circular magnetic flux bridging [sequent] *member* in the form of a circular yoke 74. Four closed magnetic circuits are formed by the pair of permanent magnets 58 and the circular magnetic flux bridging [sequent] *member* 74.

According to the vacuum circuit interrupter shown in FIG. [18] *17*, lines of magnetic flux are effectively circulated by way of each pair of magnets 58, a portion of the yokes 74 and the portion of the metallic tube 18. Accordingly, the magnetic flux density and the [magnetic distortion] *magnetostriction* are [extremely] *much* enhanced.

FIGS. [19] *18* to [21 show other possible embodiment] *20 are illustrations of other embodiments* of the vacuum circuit interrupter of the present invention. In the vacuum circuit interrupter shown in FIG. [10] *18* a magnetic field applying means 52 comprises a magnetic flux generating member 56 which consists of a plurality of flexible permanent magnets 58b provided on the outer surface of the metallic tube 18 and a ring-shaped yoke 76 for securing the permanent magnets 58b to the outer surface of the metallic tube 18. The permanent magnets 58b are[,] respectively[,] positioned such that the magnetic polarity of adjacent magnets is opposite. Each of the permanent magnets 58b is magnetized in the [thickness] *radial* direction thereof.

In the vacuum circuit interrupter of FIG. [19] *18*, lines of magnetic flux circulate in a magnetic path formed by permanent [magnet] *magnets* 58b, a portion of the metallic tube 18, a portion of the yoke and an adjacent permanent magnet 58b. By the magnetic flux existing in the metallic tube 18, the metallic tube 18 is magnetized to increase the apparent magnetic reluctance of the metallic 18.

FIGS. [20] *19* and [21 show] *20 are illustrations of* other examples of the magnetic flux generating member 56 employed i n the vacuum circuit [breaker] *interrupter* of FIG. [19] *18*. The magnetic flux generating member 56 of FIG. [20] *19* consists of a plurality of permanent magnets 58b formed by magnetizing a ferromagnetic plate in alternating [thickness] *radial* directions. Moreover, the magnetic flux generating member 56 of FIG. [21] *20* consists of a permanent magnet 58b formed by magnetizing *the* ferromagnetic plate in its thickness direction.

According to the present invention as described above, two [end plates] *metallic tubes* are sealed to the ends of [an] *at least one* evacuated [insulated tube and form magnetic paths] *insulating tubular section*. Within the evacuated [tube a fixed] *envelope stationary* and [a] movable [electrode] *contacts* are provided so as to be connected or separated, and to form a vacuum interrupter. A magnetic field applying means is provided so as to saturate or substantially saturate the [magnetic flux distortion] *magnetostriction* of the metallic tube. Thus it is possible to reduce substantially or eliminate noise caused by vibration of the metallic [tubes] *tube* due to [magnetic distortion] *magnetostriction*. Morever, if resin bound magnets or flexible magnets are used as permanent magnets for the magnetic field applying means, breakages and defects can be avoided and furthermore the vacuum interrupter can be made more easily and cheaply.

[Since, moreover] *Moreover*, a magnetic field applying means is provided such that the magnetic flux intensity in at [last] *least* one [portion] *of the portions* of the metallic tubes is at *or near the* saturation level[,] . *Thereby*, suppression or elimination of vibration noise caused by the effect of the alternating magnetic field [on] *in* the metallic tube [can be] *is* achieved with a means for applying a magnetic field using fewer permanent magnets or electromagnets.

What is claimed is:

[1. A vacuum-type electric circuit interrupter comprising an evacuated envelope consisting of a tubular portion of insulating material, a pair of relatively movable contacts disposed within said envelope in a location surrounded by said tubular insulating portion, at least one metallic tube for connecting said tubular portion of insulating material and for forming said evacuated envelope, and means for eliminating the magnetodistortion of said metallic tube comprising a magnetic flux generating member for supplying the magnetic flux to said metallic tube and a mounting member for mounting said magnet flux generating member to said envelope.]

[2. A vacuum circuit interrupter as claimed in claim 1, wherein said means for eliminating the magnetodistortion of the metallic tube comprising a magnetic field applying member for applying previously the magnetic field to said metallic tube.]

[3. A vacuum circuit interrupter as claimed in claim 2, wherein said magnetic field applying member comprising at least one magnetic flux generating member consisting of a permanent magnet and provided on the outer side of the metallic tube of the envelope, and a mounting member including at least one yoke for mounting said permanent magnet.]

[4. A vacuum circuit interrupter as claimed in claim 2, wherein said magnetic field applying member comprising at least one magnetic flux generating member consisting of a permanent magnet and provided on an inner surface of said metallic tube of the envelope, and a mounting member for mounting said permanent magnet to said inner surface of the metallic tube.]

[5. A vacuum circuit interrupter as claimed in claim 3, wherein said magnetic flux generating member further comprising a permanent magnet provided on an inner surface of said metallic tube.]

[6. A vacuum circuit interrupter as claimed in claim 3, said mounting member includes a circular shaped yoke.]

[7. A vacuum circuit interrupter as claimed in claim 2, wherein said magnetic field applying member comprising at least one magnetic flux generating member including at least one electric magnet which consists a yoke provided at the outer side of said metallic tube and a lead wire wound over said yoke.]

[8. As claimed in claim 2, wherein said magnet field applying member comprising at least one magnetic field applying member including at least one electric magnet which consists of a yoke secured to an inner surface of said metallic tube and a lead wire wound over said yoke.]

[9. A vacuum circuit interrupter as claimed in claim 7, wherein said electric magnet comprising a circular shaped yoke provided coaxially with said metallic tube and at outer sides of the metallic tube and a lead wire wound on said yoke.]

[10. A vacuum circuit interrupter as claimed in claim 1, wherein said means for eliminating the magnetodistortion of the metallic tube comprising means for increasing the magnetic reluctance of said metallic tube of the envelope.]

[11. A vacuum circuit interrupter as claimed in claim 10, wherein said magnetic reluctance increasing means comprises at least one permanent magnet directly secured to an outer surface of said metallic tube of the envelope.]

[12. A vacuum circuit interrupter as claimed in claim 10, wherein said magnetic reluctance increasing means comprising a plurality of permanent magnets secured on said metallic tube spaced apart from each.]

[13. A vacuum circuit interrupter as claimed in claim 12, said means further comprising a magnetic flux by-passing segment which comprises an arc-shaped yoke.]

[14. A vacuum circuit interrupter as claimed in claim 13, wherein said magnetic flux by-passing segment comprising a ring-shaped yoke.]

[15. A vacuum circuit interrupter as claimed in claim 10, said magnetic reluctance increasing means comprising at least one electric magnet which consists of a C-shaped yoke secured on an outer surface of the metallic tube and a lead wire wound on said yoke.]

*16. A vacuum-type electric circuit interrupter comprising an evacuated envelope including a tubular portion of electrically insulating material, a pair of relatively movable contacts disposed within said envelope, at least one metallic tube of magnetic material connected to said tubular portion of insulating material, said tube having a tendency to be magnetostrictive, and means for substantially eliminat-*

*ing the magnetostrictive tendency of said metallic tube, said eliminating means comprising a magnetic flux generating member for supplying a magnetic flux to and along said metallic tube such that the density of the magnetic flux in a portion of said metallic tube reaches a saturation level, and a mounting member for mounting said magnetic flux generating member on said envelope.*

*17. A vacuum circuit interrupter as claimed in claim 16, wherein said magnetic flux generating member comprises a permanent magnet provided on an outer side of the metallic tube of the envelope, the mounting member including at least one yoke for mounting said permanent magnet.*

*18. A vacuum circuit interrupter as claimed in claim 16, wherein said magnetic flux generating member comprises a permanent magnet provided on an inner surface of the metallic tube of the envelope, and the mounting member mounting said permanent magnet to said inner surface of the metallic tube.*

*19. A vacuum circuit interrupter as claimed in claim 17, wherein said magnetic flux generating member further comprises an additional permanent magnet provided on an inner surface of the metallic tube.*

*20. A vacuum circuit interrupter as claimed in claim 17, wherein said mounting member includes a circularly shaped yoke.*

*21. A vacuum circuit interrupter as claimed in claim 16, wherein said magnetic flux generating member comprises at least one electro-magnet including a yoke provided on an outer side of the metallic tube and a lead wire wound over said yoke.*

*22. A vacuum-type electric circuit interrupter comprising an evacuated envelope including a tubular portion of electrically insulating material, a pair of relatively movable contacts disposed within said envelope, at least one metallic tube of magnetic material connected to said tubular portion of insulating material, said tube having a tendency to be magnetostrictive, and means for substantially eliminating the magnetostrictive tendency of said metallic tube, said eliminating means comprising a magnetic flux generating member for supplying magnetic flux to and along said metallic tube, the magnetic flux density in a portion of said metallic tube being such that the magnetic flux in the tube portion reaches a saturation level.*

*23. A vacuum circuit interrupter as claimed in claim 22, wherein said magnetic flux generating member comprises at least one permanent magnet directly secured to an outer surface of the metallic tube of the envelope.*

*24. A vacuum circuit interrupter as claimed in claim 22, wherein said magnetic flux generating member comprises a plurality of spaced apart permanent magnets secured on the metallic tube.*

*25. A vacuum circuit interrupter as claimed in claim 22, wherein said magnetic flux generating member further comprises a magnetic flux by-passing segment which comprises an arc-shaped yoke.*

*26. A vacuum circuit interrupter as claimed in claim 25, wherein said magnetic flux by-passing segment comprises a ring-shaped yoke.*

*27. A vacuum circuit interrupter as claimed in claim 22, wherein said magnetic flux generating member comprises at least one electro-magnet including a C-shaped yoke secured on an outer surface of the metallic tube and a lead wire wound on said yoke.*

* * * * *